US012206522B2

(12) United States Patent
Gerlach et al.

(10) Patent No.: US 12,206,522 B2
(45) Date of Patent: Jan. 21, 2025

(54) SENSOR ASSEMBLY OF A VEHICLE

(71) Applicant: Robert Bosch GmbH, Stuttgart (DE)

(72) Inventors: Michael Gerlach, Weil Der Stadt (DE); Albrecht Klotz, Leonberg (DE); Balint Nagy, Vecsés (HU); Dirk Schmid, Simmozheim (DE); Matthias Renner, Weil Der Stadt (DE); Stephan Voehringer, Lichtenstein (DE); Thomas Treptow, Leonberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 54 days.

(21) Appl. No.: 18/006,653

(22) PCT Filed: Aug. 5, 2021

(86) PCT No.: PCT/EP2021/071949
§ 371 (c)(1),
(2) Date: Jan. 24, 2023

(87) PCT Pub. No.: WO2022/033964
PCT Pub. Date: Feb. 17, 2022

(65) Prior Publication Data
US 2023/0283501 A1 Sep. 7, 2023

(30) Foreign Application Priority Data
Aug. 11, 2020 (DE) .................... 10 2020 210 158.2

(51) Int. Cl.
*H04L 12/40* (2006.01)
(52) U.S. Cl.
CPC ............ *H04L 12/40039* (2013.01); *H04L 2012/40273* (2013.01)

(58) Field of Classification Search
CPC ................................................. G05B 23/0283
See application file for complete search history.

(56) References Cited

U.S. PATENT DOCUMENTS

| 4,807,149 A | 2/1989 | Mehnert |
| 10,281,499 B2 * | 5/2019 | Cheng ................ G01R 19/0092 |

(Continued)

FOREIGN PATENT DOCUMENTS

| DE | 102008044777 A1 | 3/2010 |
| DE | 102018205590 A1 | 10/2019 |

(Continued)

OTHER PUBLICATIONS

International Search Report for PCT/EP2021/071949, Issued Oct. 27, 2021.

*Primary Examiner* — Henry Tsai
(74) *Attorney, Agent, or Firm* — NORTON ROSE FULBRIGHT US LLP; Gerard A. Messina

(57) ABSTRACT

A sensor assembly of a vehicle. The sensor includes a control device, a multitude of sensors, each sensor having an individual sensor identifier, a data bus, which connects each sensor to the control device, and a supply line, which connects each sensor to the control device for a voltage supply. Each sensor has a shunt resistor. All shunt resistors are integrated in series into the supply line. Each sensor is developed to detect a voltage drop at its respective shunt resistor. The control device is developed to actuate each sensor with the aid of the individual sensor identifier and to assign an individual geographical address to each sensor based on the detected voltage drops along the supply line.

15 Claims, 3 Drawing Sheets

(56) References Cited

U.S. PATENT DOCUMENTS

2018/0246144 A1\* 8/2018 Kaya .................. G01R 1/203
2018/0375738 A1  12/2018 Van der Wel et al.
2019/0370206 A1\* 12/2019 Akbarian ............ G06F 13/4063

FOREIGN PATENT DOCUMENTS

| DE | 102018124279 A1 | 1/2020 |
|----|-----------------|--------|
| JP | 2005122530 A | 5/2005 |
| JP | 2013015883 A | 1/2013 |
| JP | 2014241575 A | 12/2014 |
| JP | 2019050502 A | 3/2019 |
| JP | 2020061878 A | 4/2020 |

\* cited by examiner

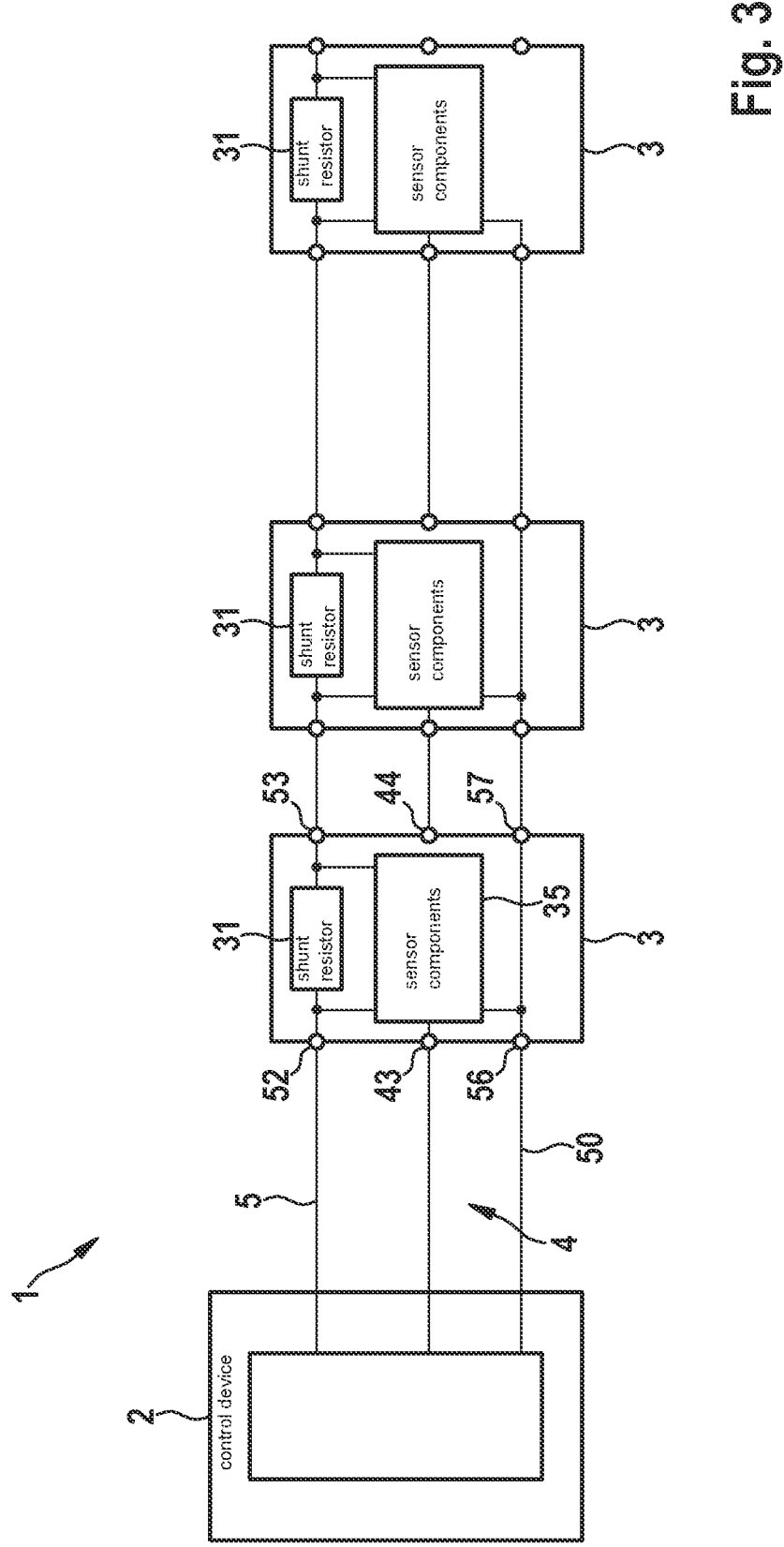

SENSOR ASSEMBLY OF A VEHICLE

FIELD

The present invention relates to a sensor assembly of a vehicle and to a method for addressing sensors of a sensor assembly.

BACKGROUND INFORMATION

Sensor assemblies for assistance systems of vehicles such as a parking-assistance systems, which include a multitude of usually identical ultrasonic sensors, are available in the related art. Prior to the initial startup of the assistance system or during a replacement of individual sensors, correct addressing of the sensors is required in order to allow the sensor data of each sensor to be assigned to a correct physical position relative to the other sensors. This generally requires cost-intensive hardware and/or a complex calibration process.

SUMMARY

In a sensor assembly according to the present invention, it is possible to address the sensors in an especially simple manner using simple and cost-effective hardware. According to an example embodiment of the present invention, this may be achieved by a sensor assembly which includes a control device, a multitude of sensors, a data bus which connects each sensor to the control device for a data transmission, and a supply line, which connects each sensor to the control device for a voltage supply. In this context, the voltage supply of the sensors is preferably understood to denote that an electrical energy source is integrated into the control device to provide the voltage supply of the sensors. As an alternative, it is preferably also possible to supply an electric energy source that is separate from the control device to provide the voltage supply of the sensors, such as a vehicle battery. In the case of such a separate energy source, for example, the voltage supply of the sensors may be implemented via the control device, the control device especially being designed to interrupt the voltage supply and to switch it through to the sensors. All sensors are preferably connected in a parallel connection to the control device with the aid of the data bus. Each sensor has an individual sensor identifier such as an individual serial number, which particularly is able to be read out by the control device.

According to an example embodiment of the present invention, each sensor includes a shunt resistor. All shunt resistors of the sensors are integrated in series into the supply line, or in other words, are connected to one another in a series connection in particular. Each sensor is designed to detect a voltage drop at its respective shunt resistor. The control device is designed to actuate, in particular separately, each sensor of the multitude of sensors with the aid of the individual sensor identifier. In the process, the control device preferably actuates all sensors one after the other or, alternatively, at the same time. In addition, the control device is designed to assign an individual geographical address to each sensor based on the voltage drops along the supply line detected by the sensors. An address by which the control device is able to identify a sequence of the sensors on the data bus is regarded as a geographical address in this context. The control device is preferably developed to ascertain a time sequence and/or a number of detected voltage drops at the shunt resistors and to assign the geographical addresses to the sensors on that basis.

In this context, in particular an increase or a change in a voltage across the shunt resistor caused by a predefined actuation of at least one sensor is considered a voltage drop. This means that a constant voltage in the shunt resistor caused by a quiescent current and/or voltage offsets, for instance, is not regarded as such a voltage drop.

In other words, each of the sensors has a shunt resistor with whose aid it can be detected when a current is flowing through the respective sensor. Because the shunt resistors are arranged in series, when a specific sensor is actuated, the current flows through all sensors situated upstream on the data bus, i.e., closer to the control device, and their shunt resistors. As a result, a voltage drop can be registered at each of the shunt resistors situated between the actuated sensor and the control device. A voltage drop can preferably also be registered at the actuated sensor itself, depending on its configuration or, as an alternative, no voltage drop may be registered there any longer.

Based on the number of voltage drops, it is therefore easy to infer the position of the actuated sensor on the data bus. This makes it possible to distinguish the different sensors from one another based on the detection of the voltage drops at the shunt resistors. More specifically, a sequence of the sensors is able to be ascertained in this way. Based on this information, an individual geographical address can be assigned to each sensor, thus making it possible to unambiguously assign the sensor data generated by the sensor to a location. The geographical addresses of the sensors may be assigned in a centralized manner with the aid of the control device. As an alternative or in addition, each sensor is able to assign the geographical address to itself or to all sensors.

The sensor device is therefore able to unambiguously assign a predefined location on the data bus to the sensor data transmitted via the data bus by a specific sensor. For example, if the sensor assembly is part of a park-pilot system, this preferably enables the control device to detect which one of the sensors is situated at which particular position in a bumper covering of the vehicle, thereby making it possible, for example, to ascertain a direction of an obstacle that was detected in the environment of the vehicle. For instance, a display having a lateral resolution may thereby be actuated with the aid of the control device for the visual display of the location of the obstacle.

This particularly presupposes knowledge of a topology of the data bus. In other words, the sensor assembly has a plurality of sensor receptacles on which a sensor is mounted in each case, in particular along a direction of the data bus, the sensor receptacles being positioned in predefined/previously known positions relative to one another.

Within the sensors, e.g., on a substrate board of each sensor, a voltage supply of sensor components of all sensors is preferably implemented essentially in parallel with regard to the voltage supply of the control device. This means, for instance, that a voltage supply of the sensor components within the sensor may branch off from the supply line looped through with the aid of the shunt resistors. Given a unique geographical assignability of geographical addresses to the sensors, the sensor assembly offers the advantage of allowing for an essentially parallel voltage supply of the sensor components of all sensors with regard to the voltage supply. Given such a construction, all sensor components are able to receive an optimal voltage supply.

In particular, internal resistances of the sensors or components of the sensors thus have only a negligible or no influence on the voltage supply of the sensor components. In this way, virtually any number of sensors are able to be linked to one another on the data bus.

According to an example embodiment of the present invention, the supply line and the data bus may preferably be provided as separate cables. It is alternatively also possible to combine the supply line and the data bus in a shared cable, which is routed into the sensor at a preferably single pin.

According to an example embodiment of the present invention, the data bus may preferably have a single data line to which each sensor is connected. As an alternative, the data bus can also have two or more data lines, in which case each sensor is connected to each data line.

According to an example embodiment of the present invention, the sensors are preferably identical, i.e., have the same design, but each sensor has an individual sensors identifier such as an individual serial number.

Because of the connection of the sensors to the control device via a data bus, each sensor is therefore able to selectively communicate with the control device at a particularly low hardware expenditure, and especially without any separate wiring between each sensor and the control device by way of a separate line. Another advantage that results from this is that a simple exchange of sensors of the same design is possible, in which case the exchanged sensor can be addressed in an automatic and simple manner.

Preferred refinements of the present invention are disclosed herein.

After an actuation by the control device, the sensor preferably generates a current signal on the supply line that has a certain frequency signature. This means that in response to the actuation of the sensors by the control device, each sensor generates a current signal having a specific, preferably individual frequency signature on the supply line, thereby in particular making it possible to distinguish the sensors from one another.

A voltage tap-off for the voltage supply of sensor components of each sensor on the supply line preferably takes place upstream or downstream from the respective shunt resistor. A voltage tap-off downstream from the shunt resistor ensures that the own supply of the sensor components does not become part of the measurement of the voltage drop at the shunt resistor, so that the voltage drops at the shunt resistors can be acquired or estimated using especially simple means. As an alternative, the supply of the sensor components may also branch off behind the shunt resistor.

Preferably, the shunt resistor is a metal-foil resistor or a copper circuit trace.

According to an example embodiment of the present invention, a copper circuit trace may preferably be part of a circuit board of the sensor. This makes it possible to provide the shunt resistor in an especially simple and economical manner. As an alternative, the shunt resistor may also be developed as at least one bond wire or include a bond wire. In the design, among others, there are the following two options for realizing the shunt resistor with the aid of a corresponding bonding of the ASIC of the respective sensor components. The first option consists of bonding the supply line from a contact point on the lead frame of the ASIC, the so-called 'pin', to the pad in the silicon using a bond wire, from where, in the case of an ultrasonic sensor, the ASIC supply can be appropriately conveyed further. Moreover, a low-resistance connection, which may likewise be embodied as a bond wire, is established from this pad to the neighboring pad, and a corresponding bond wire is used to bond from this neighboring pad back to the lead frame. The sum of the resistance values of the bond wires and possibly the resistance value of the connection between the pads in the silicon constitutes the actual shunt resistance. The second option consists of bonding the supply line with the aid of a bond wire from the lead frame onto the pad in the silicon. Furthermore, from the contact point of the lead frame (pin), bonding is implemented to the contact point of the lead frame for the neighboring pin, this bond connection constituting the shunt resistor in this second option. Depending on the required resistance value and current carrying capability, an embodiment of the shunt resistor may also include double or triple bonds. The material and the thickness of the respective bond wire may furthermore be adapted according to the requirements. The advantage of a corresponding development of the shunt resistor with the aid of at least one bond wire is that the cost of such a shunt resistor is considerably below the cost of a conventional shunt resistor. That a correspondingly developed shunt resistor may be used in the first place can be attributed to the fact that the requirements on the resistance tolerance of ~50% and also the maximum current carrying capacity of less than 2 A, which apply especially to ultrasonic applications, can continue to be met by such a bond wire shunt resistor.

According to an example embodiment of the present invention, especially preferably, the shunt resistor has an electrical resistance of maximally $0.1\Omega$, preferably maximally $0.01\Omega$, and in particular at least $0.001\Omega$. Thus, it preferably is a low-resistance resistor. Because of the shunt resistors, i.e., for the ascertainment of the positions of the sensors on the data bus, this ensures a minimal electric power consumption.

Each sensor preferably has a differential amplifier which ascertains the voltage drop across the respective shunt resistor. The differential amplifier is preferably developed to amplify the voltage drop across the shunt resistor, which allows for an especially accurate and reliable detection of the voltage drops.

According to an example embodiment of the present invention, especially preferably, each sensor also includes a filter, which is designed to filter an output signal generated by the respective differential amplifier. The filter is a bandpass filter or a matched filter in particular. The filter may preferably be developed to filter the output signal of the differential amplifier using a direct voltage coupling and/or using an alternating voltage coupling. A direct voltage coupling describes an acquisition of all signal components of an input signal of the differential amplifier. This results in a particularly simple and cost-effective design of the sensor assembly. An unambiguous detection of a current flow into the corresponding shunt resistor may preferably be detected by comparing the corresponding voltage drop with the aid of a predefined voltage threshold value. An acquisition of only an alternating voltage component of the input signal of the differential amplifier is regarded as an alternating voltage coupling. In this way, an especially robust ascertainment of the voltage drops featuring a low interference susceptibility is able to be carried out so that an unequivocal detection of an actuation of specific sensors is possible. In particular when a current pulse featuring a certain frequency signature is generated in the actuation of a specific sensor, this frequency signature in the detected voltage drop can be ascertained with the aid of the filter with an alternating voltage coupling. As a result, it can be accurately detected whether a selective actuation of the sensor is present because an acquiescent voltage draw or a voltage offset in the supply line, for instance, is/are filtered out.

The ground line and/or the data bus is/are preferably routed through each sensor, preferably with the aid of an input pin and an output pin per sensor. The ground line and/or the data bus is/are thereby particularly subdivided into multiple individual sections. The data bus is preferably routed through the sensors in such a way that a data exchange continues to take place, like in a parallel connection of the sensors. In other words, the data exchange within the sensors, e.g., on a circuit board of each sensor, is carried out in parallel with regard to the control device. In this way, all interfaces of the sensors are able to be connected with the aid of pins, thereby obviating the need for a connection of the sensors to the ground line and/or the data bus with the aid of additional connection lines and splices. This may result in cost advantages, depending on the construction of the sensor assembly.

The control device especially preferably has a non-volatile memory. Alternatively or additionally, each sensor includes a non-volatile memory. The assigned geographical addresses can be stored with the aid of such a non-volatile memory so that the assignment process has to be carried out only once since the geographical addresses can subsequently be read out from the non-volatile memory. As an alternative, the control device and/or all sensors may be developed in a memoryless manner, that is, without a memory. This makes it possible to provide a particularly cost-effective sensor assembly. In this case, the addressing is required before every operation of the sensor assembly. Nevertheless, a particularly rapid and resource-sparing addressing can be implemented because of the special construction of the sensor assembly.

According to an example embodiment of the present invention, the sensors are preferably ultrasonic sensors. Thus, the sensor assembly is an ultrasonic system in particular, which is able to be used for distance measurements. For example, the sensor assembly may be employed for a distance detection in a parking assistance system or some other driver assistance system. The ultrasonic sensors are preferably mounted in fixed positions in a bumper covering of the vehicle. In particular, the ultrasonic sensors are fixed in place on a bumper of the vehicle, and at least two and maximally 12 ultrasonic sensors are preferably provided for each bumper.

In addition, the present invention leads to a method for addressing sensors in a sensor assembly. The sensor assembly is preferably the afore-described sensor assembly.

According to an example embodiment of the present invention, the sensor assembly includes a control device, a multitude of sensors, each sensor having an individual sensor identifier, a data bus, which connects each sensor to the control device, and a supply line, which connects each sensor to the control device for a voltage supply. Each sensor has a shunt resistor. All shunt resistors of the multitude of sensors are integrated in series into the supply line, or in other words, are situated in the supply line. The present method includes the following steps for each sensor:
  identifying the sensor identifier of the sensor,
  actuating the sensor based on the sensor identifier,
  ascertaining voltage drops at the shunt resistors of all sensors, and
  assigning an individual geographical address to the actuated sensor based on the ascertained position.

According to an example embodiment of the present invention, the ascertaining of the position of the actuated sensor is implemented based on the detected voltage drops along the supply line. The ascertaining of the position of the actuated sensor preferably takes place on the basis of a time sequence and/or the number of detected voltage drops along the supply line. The detection of the voltage drops at the shunt resistors makes it very easy to ascertain the way in which the sensors are situated relative to one another, i.e., the sequence in which they are disposed. Because the shunt resistors are positioned in series, when a specific sensor is actuated the current flows through all shunt resistors situated upstream from the data bus, that is, closer to the control device. Thus, it is possible to register a voltage drop at each of these shunt resistors. Based on the number of voltage drops, the position of the actuated sensor on the data bus is therefore easily inferable. The present method thus provides a particularly simple possibility for addressing the sensors, which is able to be automatically carried out with a design of the sensor assembly that is especially cost-effective and optimized with regard to low electrical losses.

The present method for addressing the sensors is preferably carried out exactly once, in particular during the initial startup of the sensor assembly. As an alternative, however, the method can be carried out during each startup of the sensor assembly.

All sensors are preferably actuated in succession, and after all sensors have been actuated, a sequence of the sensors on the data bus is ascertained based on a descending number of detected voltage drops per sensor. Based on the sequence of the sensors on the data bus, all sensors can then be assigned the individual geometrical addresses. Each sensor is preferably actuated separately and precisely once for this purpose. As an alternative, it is also possible to actuate all sensors multiple times, but all sensors are especially actuated the same number of times. In other words, the sensors are sorted according to the descending number of detected voltage drops in each sensor, starting from the control device. That means, the particular sensor featuring the most ascertained voltage drops at its shunt resistor is situated in first position on the data bus from the direction of the control device. The particular sensor having the lowest number of registered voltage drops is therefore situated at the end of the data bus. As a result, the sequence of the sensors on the data bus is able to be ascertained in an especially simple manner and with a low computational effort, based on which the geographical addresses can also be unambiguously assigned.

Preferably, each sensor is actuated separately, and a total number of voltage drops is ascertained at all sensors during each actuation of an individual sensor. The position of each individually actuated sensor relative to the further sensors is ascertained based on the total number of detected voltage drops at all sensors. In other words, based on the total number of voltage drops detected during the actuation of an individual sensor, it is possible to ascertain the number of sensors that are situated on the data bus between the actuated sensor and the control device. For instance, if the voltage supply of the sensor components of the actuated sensors branches off upstream from its shunt resistor, then the detected number of voltage drops corresponds to the number of sensors situated upstream. In this way, it is possible to ascertain the position of each sensor on the data bus also in a particularly simple manner and with a low computational effort. The assigning of the geographical address may be carried out directly after the position of the actuated sensor is ascertained or, alternatively, after all positions of all sensors have been ascertained.

As an alternative, each sensor is preferably actuated concurrently, especially simultaneously. After the concurrent actuation of each sensor, the magnitude of a voltage drop ascertained at each sensor is ascertained. In other words, the magnitude of the measured total voltage drop at the particular sensor in the chain is ascertained in each case. The position of the actuated sensor relative to the further sensors will then be ascertained based on the magnitude of a voltage drop determined at each sensor. The sensor situated closest in the direction of the data bus therefore ascertains the highest total voltage drop because it detects the voltage drops of all sensors situated in series behind it. The sensor most remote in the direction of the data bus, on the other hand, ascertains the lowest total voltage drop. Thus, the sequence of the sensors on the data bus is ascertained based on a descending magnitude of the voltage drops at the individual sensors. The advantage of the simultaneous method is the faster processing in comparison with the sequential method and the independence of the duration from the number of sensors on the bus. In this simultaneous method, each sensor is preferably developed to measure the magnitude of the voltage drop with sufficient accuracy and then to transmit it to the control device.

The voltage drops across the shunt resistors are preferably amplified with the aid of a differential amplifier for each sensor. An output signal generated by the differential amplifier is filtered with the aid of a filter per sensor. Based on the filtered output signal, a magnitude of the voltage drop at the shunt resistor is ascertained. The filter preferably filters the output signal of the differential amplifier with the aid of a band-pass filter or matched filter. Based on the ascertained magnitude of the voltage signal, a detected actuation of the corresponding sensor can preferably be verified. Through the selection of the filter parameters according to the frequency signature of an actuation signal supplied by the control device by which the sensor is actuated, it is preferably possible to unambiguously determine whether an actual, selective actuation has occurred or whether an interference signal or the like was detected. This makes the method for addressing the sensors particularly robust.

Especially preferably, a logical address based on the sensor identifier is assigned to each sensor prior to the actuation. The actuation of the sensor is implemented using the logical address. Assigning logical addresses to the sensors enables the control device to distinguish the sensors from one another in a particularly uncomplicated manner and to actuate them directly and separately.

Each assigned geographical address is preferably stored in a non-volatile memory of the individual sensor and/or in a non-volatile memory of the control device. In this way, for instance, an addressing of the sensors is required only a single time. In a renewed startup of the sensor assembly, the geometrical addresses may simply be read out from the non-volatile memory/memories with the aid of the control device so that no renewed addressing of the sensors is necessary.

Based on an unknown and/or changed individual sensor identifier, it can preferably be detected if one of the sensors has been exchanged, e.g., in a repair case. In response to such a detection, a new assignment of a geometrical address may be initiated.

BRIEF DESCRIPTION OF EXAMPLE EMBODIMENTS

In the following text, the present invention will be described on the basis of exemplary embodiments in conjunction with the figures. Functionally equivalent components have been provided with the same reference numerals in the figures.

FIG. 3 shows a simplified, schematic view of a sensor assembly according to a second exemplary embodiment of the present invention.

DETAILED DESCRIPTION OF EXAMPLE EMBODIMENTS

Figure 1:
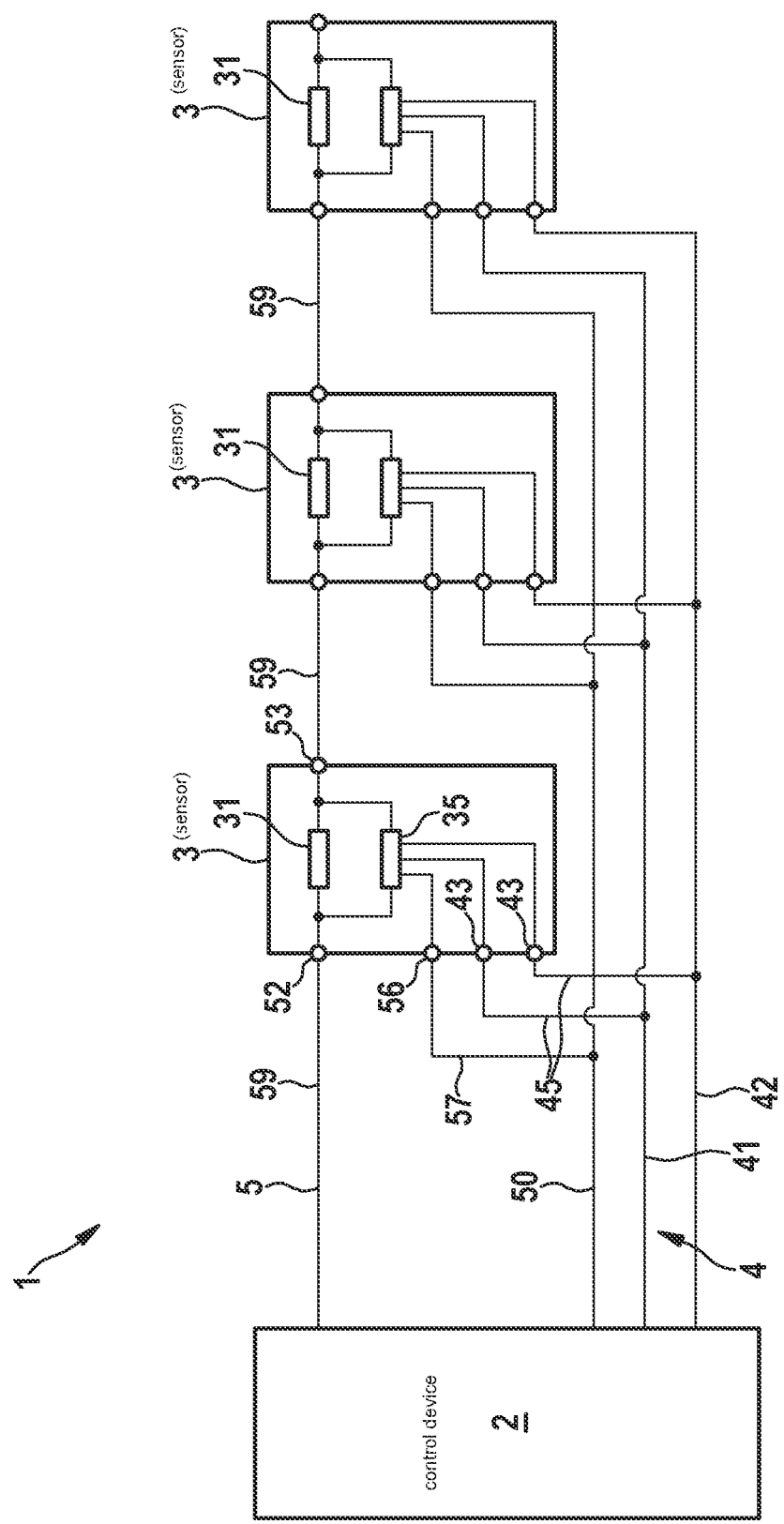
FIG. 1 shows a simplified, schematic view of a sensor assembly according to a first exemplary embodiment of the present invention.

FIG. 1 shows a simplified, schematic view of a sensor assembly 1 of a vehicle according to a first exemplary embodiment of the present invention. Sensor assembly 1 includes a control device 2 and a multitude of sensors 3. For instance, sensor assembly 1 may include three sensors 3, as shown in the figures. As an alternative, any number of sensors 3 may be used, preferably two, four or six sensors 3. Sensors 3 are identical in their construction, that is, have the same design, but they have different individual serial numbers. Sensors 3 are ultrasonic sensors, which makes it possible to detect objects in the near environment of the vehicle through the emitting and receiving of ultrasonic signals.

Figure 2:
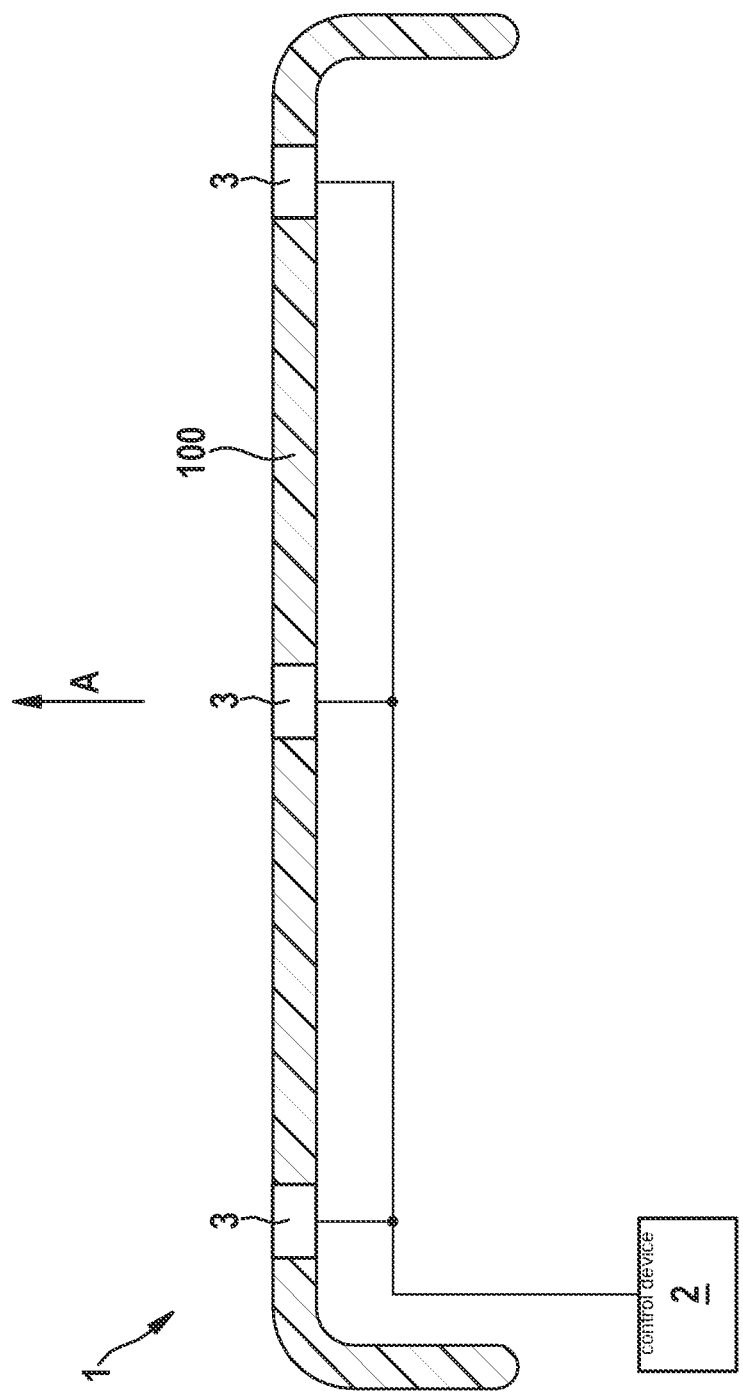
FIG. 2 shows a simplified, schematic view of the sensor assembly of FIG. 1 in a state installed in a bumper covering of a vehicle.

As illustrated in FIG. 2 in a simplified and schematic manner, sensor assembly 1 may be installed in a covering part 100 of a vehicle (not shown). Sensors 3 are situated at individually predefined positions of covering part 100. To allow for a spatial assignment of the sensor data generated by sensors 3, that is, to distinguish whether specific sensor data were generated by left sensor 3 in the driving direction or by right sensor 3, for instance, geographical addressing of each sensor 3 is required prior to the start of an environment detection with the aid of sensor assembly 1.

The constructive development of sensor assembly 1 and the implementation of the addressing of sensors 3 will be described in the following text.

Sensor assembly 1 includes a supply line 5, a ground line 50, and a data bus 4, which has two parallel data lines 41, 42.

Ground line 50 and the two data lines 41, 42 are developed as one-piece lines in each case and connect sensors 3 to control device 2. Per line, a connection element 45, 57 in the form of a short line piece is provided for the connection to sensor 3. Moreover, each sensor 3 has output pins 43, 56 for the connection to these connection elements 45, 57.

Supply line 5 is subdivided into multiple supply line sections 59, each section connecting control device 2 to first sensor 3 and to successively positioned sensors 3. Supply line sections 59 are connected to each sensor 3 with the aid of an input pin 52 and an output pin 53.

Using the individual sensor identifiers, control device 2 can distinguish sensors 3 from one another. Control device 2 may assign a logical address to each sensor 3 based on its individual sensor identifier in order to be able to actuate sensors separately and to distinguish them.

Each sensor 3 has a shunt resistor 31. Shunt resistors 31 of all sensors 3 are integrated into supply line 5 in a series circuit. The wiring with respect to shunt resistors 31 may thus be regarded as a "daisy chain".

Shunt resistors 31 have a low-resistance design, in particular featuring an electrical resistance of maximally 0.1Ω, so that only a low electric power drop occurs at shunt resistors 31.

In addition, each sensor 3 includes sensor components 35, which, for instance, are designed to generate and receive the ultrasonic signals. A voltage supply of sensor components 35 is implemented with the aid of a voltage tap-off upstream from respective shunt resistor 31 of sensor 3. Because shunt resistors 31 have a low resistance, sensor components 35 may be regarded as being essentially switched in parallel with respect to the voltage supply with the aid of control device 2.

Each sensor 3 is designed to detect a volt drop at its shunt resistor 31. Such a voltage drop may be detected when a current flows through corresponding shunt resistor 31. This is the case when one of the sensors 3 following in the series of sensors 3 along data bus 4 is actuated.

The detection and analysis of the voltage drop at shunt resistor 31 is implemented with the aid of a differential amplifier and a filter. The differential amplifier and filter are part of sensor components 35 and not separately shown in the figures. The differential amplifier is designed to amplify the voltage drop across shunt resistor 31. In addition, the filter is designed to filter an output signal of the differential amplifier with the aid of a band-pass filter or matched filter. This makes it possible to ascertain frequencies in the voltage signal dropping at shunt resistor 31 so that a current flow through corresponding sensor 3 is able to be detected in a reliable manner and with a high noise immunity.

The geographical addressing of sensors 3 may be accomplished based on a detection of the voltage drops along supply line 5, as described in the following text.

At the start, control device 2 actuates all sensors 3. Each sensor 3 is actuated separately, i.e., in succession. The actuation takes place in such a way that each sensor 3 emits an ultrasonic signal. To this end, each sensor is actuated by a current pulse having a predefined frequency signature. During the actuation of one of sensors 3, all sensors 3 simultaneously detect whether a drop in the voltage at its shunt resistor 31 has occurred. Through an analysis of the voltage drop at shunt resistor 31, optimized with the aid of the differential amplifier and the filter, it is possible to unambiguously detect whether corresponding sensor 3 was selectively actuated by control device 2 or whether, for example, an interference signal or a constant voltage offset is present.

After each sensor 3 has been actuated precisely once, the number of detected voltage drops per sensor 3 is ascertained. A sequence of sensors 3 on data bus is subsequently ascertained based on a descending number of detected voltage drops for each sensor 3. That means that the specific sensor 3 having the most voltage drops is situated in first position on data bus 4, starting from control device 2.

Next, control device 2 assigns the respective geographical addresses to sensors 3 according to the ascertained sequence.

Sensor assembly 1 and the method for addressing are characterized by a particularly cost-effective development and a simple practicability. It is especially advantageous that, given a virtually parallel voltage supply of all sensors 3, a type of series concatenation of sensors 3 with the aid of shunt resistors 31 is present nevertheless, which allows for an ascertainment of the relative positions of all sensors 3 with respect to one another by counting the voltage drops along data bus 4.

Because the voltage supply is implemented virtually in parallel, all sensors 3 are able to be supplied with the same operating voltage. As a result, sensor assembly 1 can be expanded by any number of sensors 3, and all sensors 3 are always able to be supplied with the same voltage using a simple and cost-effective device development of sensor assembly 1.

One alternative implementation of the addressing will be described in the following text.

Instead of the afore-described sorting after the fact, it is also possible to ascertain the position of each sensor 3 on data bus 4 in a separate and simple manner. To this end, each sensor 3 is actuated precisely once.

After a single sensor 3 has been actuated, a total number of voltage drops at all sensors 3 of sensor assembly 1 is ascertained. The position of the individually actuated sensor 3 relative to the further sensors 3 is subsequently ascertained based on the total number of voltage drops in sensor assembly 1. Based on the total number of voltage drops, control device 2 is then able assembly detect how many sensors 3 are situated on data bus 4 upstream from sensor 3 which was actuated just then, and to identify the position of actuated sensor 3 on that basis.

Since in an actuation of a specific sensor 3, a current is flowing through all sensors 3 situated upstream on data bus 4, a current drop is detected at every one of these sensors 3. For example, if middle sensor 3 is actuated in the sensor assembly 1 shown in FIG. 1, then a current flow in shunt resistor 31 is present only on the left, i.e., first sensor 3, on data bus 4. Based thereon, control device 2 is able to detect that only one sensor 3 is situated upstream from actuated sensor 3, which means that it is positioned in second place on data bus 4.

The assigned geographical address may subsequently be stored in a non-volatile memory of control device 2 and/or in a non-volatile memory of actuated sensor 3. As an alternative, it is also possible to provide sensors 3 without a memory and a control device 2 without a memory, in which case the addressing is undertaken during each startup of sensor assembly 1.

In a further alternative, all sensors 3 generate a current pulse concurrently, that is, synchronously. After the concurrent actuation of each sensor 3, the magnitude of a voltage drop determined at each sensor is ascertained. In other words, it is ascertained how high the individually measured total voltage drop is at respective sensor 3 in the chain. The position of actuated sensor 3 relative to further sensors 3 is then ascertained based on the magnitude of a voltage drop determined at each sensor 3. Left sensor 3 closest in the direction of data bus 4 therefore ascertains the highest total voltage drop because it detects the voltage drops of all sensors 3 situated behind it in the series. In contrast, right sensor 3 situated at the greatest distance in the direction of data bus 4 ascertains the lowest total voltage drop. Thus, the sequence of sensors 3 on data bus 4 is ascertained based on a descending magnitude of the voltage drops at respective sensors 3.

FIG. 3 shows a simplified, schematic view of a sensor assembly 1 according to a second exemplary embodiment of the present invention. The second exemplary embodiment essentially corresponds to the first exemplary embodiment of FIG. 1 with an alternative wiring of sensors 3. In the second exemplary embodiment of FIG. 3, supply line 5, ground line 50 and data bus 4 are routed through each sensor 3. For each line 5, 4, 50, each sensor 3 has an input pin 52, 43, 56 and an output pin 53, 44, 57. Within sensors 3, e.g., on a circuit board of each sensor 3, a voltage tap-off still takes place in such a way that sensor components 35 of all sensors 3 to be supplied with voltage continue to be switched essentially in parallel with respect to control device 2. In the same way, the data exchange may continue to be carried out in parallel with respect to control device 2. Such a construction makes it possible to save connection lines and branching points on the lines, which are known as 'splices'.

What is claimed is:

1. A sensor assembly of a vehicle, comprising:
   a control device;

a multitude of sensors, each of the sensors having a sensor identifier;

a data bus, which connects each sensor to the control device; and a supply line, which connects each of the sensors to the control device for a voltage supply;

wherein:
each of the sensors has a respective shunt resistor,
all of the respective shunt resistors are integrated in series into the supply line, each of the sensors being configured to detect a voltage drop at its respective shunt resistor, and
the control device is configured to:
actuate each of the sensors with the sensor identifiers, and
assign an individual geographical address to each of the sensors based on the detected voltage drops along the supply line;
wherein each of the respective shunt resistors is a metal-foil resistor or a copper circuit trace or includes at least one bond wire.

2. The sensor assembly as recited in claim 1, wherein after the actuation of the sensor, the sensor generates a current signal on the supply line that has a certain frequency signature.

3. The sensor assembly as recited in claim 1, wherein a voltage tap-off of each of the sensors, for a voltage supply of sensor components of each of the sensors, is configured on the supply line upstream or downstream from a respective one of the shunt resistors.

4. The sensor assembly as recited in claim 1, wherein each of the respective shunt resistors has an electrical resistance of maximally 0.1Ω.

5. The sensor assembly as recited in claim 1, wherein each of the sensors has a differential amplifier by which the voltage drop across a respective one of the shunt resistors is ascertained.

6. The sensor assembly as recited in claim 5, wherein each of the sensors includes a band-pass filter or a matched filter, and the band-pass filter or the matched filter is configured to filter an output signal generated by the differential amplifier.

7. The sensor assembly as recited in claim 1, wherein a ground line and/or the data bus is routed through each of the sensors using an input pin and an output pin per sensor.

8. The sensor assembly as recited in claim 1, wherein: (i) the control device and/or each of the sensors has a non-volatile memory, or (ii) the control device and/or each of the sensors is configured without a memory.

9. The sensor assembly as recited in claim 1, wherein the sensors are ultrasonic sensors.

10. A method for addressing sensors of a sensor assembly, the method comprising:
performing the following for each of the sensors, wherein the sensor assembly includes a control device, a multitude of sensors, each of the sensors having a sensor identifier, a data bus, which connects each sensor to the control device, a supply line, which connects each of the sensors to the control device for a voltage supply, each of the sensors having a respective shunt resistor, and in which the respective shunt resistors are integrated in series into the supply line, as follows:
identifying the sensor identifier of the sensor;
actuating the sensor based on the sensor identifier;
ascertaining voltage drops at the respective shunt resistors of all of the sensors;
ascertaining a position of the actuated sensor relative to the other sensors; and
assigning an individual geographical address to the sensor based on the ascertained position, the ascertaining of the position of the actuated sensor being implemented based on the detected voltage drops along the supply line;
wherein each of the individual geographical addresses is stored in a non-volatile memory of each of the sensors and/or in a non-volatile memory of the control device.

11. The method as recited in claim 10, wherein all of the sensors are actuated in succession and after the actuation of all of the sensors, a sequence of the sensors on the data bus is ascertained based on a descending number of detected voltage drops per sensor.

12. The method as recited in claim 10, wherein each of the sensors is actuated separately, and a total number of voltage drops at all of the sensors is ascertained after each actuation of an individual one of the sensors, and the position of the actuated sensor relative to the other sensors is ascertained based on the total number of voltage drops.

13. The method as recited in claim 10, wherein each of the sensors is actuated concurrently, and after the concurrent actuation of each of the sensors, a magnitude of a voltage drop ascertained at each of the sensors is ascertained, and the position of the actuated sensor relative to the other sensors is ascertained based on the magnitude of the voltage drop ascertained at each of the sensors.

14. The method as recited in claim 10, wherein the voltage drops across the respective shunt resistors are amplified each using a differential amplifier, and an output signal generated by the differential amplifier is filtered using a filter adapted to the frequency signature, and a magnitude of the voltage drop at the respective shunt resistor is ascertained based on the output signal of the filter.

15. The method as recited in claim 10, wherein prior to the actuation, a logical address based on the sensor identifier is assigned to each of the sensors, and the actuation of the sensor is implemented using the logical address.

* * * * *